United States Patent
Klintenberg et al.

(10) Patent No.: US 10,344,856 B2
(45) Date of Patent: Jul. 9, 2019

(54) METHOD FOR CONTROLLING A MULTI-CLUTCH TRANSMISSION

(71) Applicant: VOLVO TRUCK CORPORATION, Göteborg (SE)

(72) Inventors: Oscar Klintenberg, Göteborg (SE); Andreas Magnusson, Lerum (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/562,446

(22) PCT Filed: Mar. 30, 2015

(86) PCT No.: PCT/EP2015/056911
§ 371 (c)(1),
(2) Date: Sep. 28, 2017

(87) PCT Pub. No.: WO2016/155777
PCT Pub. Date: Oct. 6, 2016

(65) Prior Publication Data
US 2018/0087664 A1    Mar. 29, 2018

(51) Int. Cl.
*F16H 61/684*    (2006.01)
*B60W 10/111*    (2012.01)
(Continued)

(52) U.S. Cl.
CPC ......... *F16H 61/684* (2013.01); *B60W 10/111* (2013.01); *F16H 61/0213* (2013.01);
(Continued)

(58) Field of Classification Search
CPC .... F16H 61/682; F16H 61/684; F16H 61/702; F16H 61/0213; F16H 2061/0223
See application file for complete search history.

(56) References Cited

U.S. PATENT DOCUMENTS

| 8,936,532 B2 * | 1/2015 | Razaznejad ......... F16H 61/0213 477/175 |
| 2009/0210122 A1 * | 8/2009 | Tao ......................... F16H 59/18 701/55 |

(Continued)

FOREIGN PATENT DOCUMENTS

| JP | 07300031 | 11/1995 |
| JP | 11325230 A | 11/1999 |
| JP | 2014126200 A | 7/2014 |

OTHER PUBLICATIONS

International Search Report (dated Dec. 18, 2015) for corresponding International App. PCT/EP2015/056911.

(Continued)

*Primary Examiner* — Erin D Bishop
(74) *Attorney, Agent, or Firm* — WRB-IP LLP

(57) ABSTRACT

In a method for controlling a multi-clutch transmission of a vehicle, wherein the multi-clutch transmission is adapted to be shifted either with a power shift or a power cut shift dependent on predetermined vehicle variables, a power shift to a higher gear in low range gear is detected, and, when the power shift to a higher gear in low range gear has been detected, a previously set gear shift strategy is overruled and the multi-clutch transmission is controlled such that a forthcoming gear shift is performed as a power shift.

5 Claims, 4 Drawing Sheets

(51) Int. Cl.
  *F16H 61/02* (2006.01)
  *F16H 61/682* (2006.01)
  *F16H 61/70* (2006.01)
  *F16H 59/14* (2006.01)
  *F16H 61/28* (2006.01)

(52) U.S. Cl.
  CPC ......... *F16H 61/682* (2013.01); *F16H 61/702* (2013.01); *F16H 2059/147* (2013.01); *F16H 2061/2823* (2013.01); *F16H 2306/14* (2013.01)

(56) References Cited

U.S. PATENT DOCUMENTS

2012/0029776 A1  2/2012  Staudinger et al.
2013/0119630 A1  5/2013  Hulbert et al.
2013/0172147 A1  7/2013  Razaznejad et al.

OTHER PUBLICATIONS

Japanese Official Action (dated Feb. 29, 2019) for corresponding Japanese App. 2017-551307.

\* cited by examiner

METHOD FOR CONTROLLING A MULTI-CLUTCH TRANSMISSION

BACKGROUND AND SUMMARY

The invention relates to a method for controlling a multi-clutch transmission of a vehicle, in particularly for controlling whether a gear shift of the multi-clutch transmission should be performed by a power shift or by a power cut shift. The invention can be applied in different vehicles such as e.g. heavy-duty vehicles, trucks, buses and construction equipment.

For a multi clutch transmission such as e.g. a dual-clutch transmission a gear change can be performed either by conventional power cut shift or by power shift. During power cut shift the torque delivered by the internal combustion engine (engine) to the driven wheels is removed before a current, first gear is disengaged. This is done by disengaging the clutch of the current, first gear. This causes a temporarily interruption of torque transferred from an engine to the driven wheels of a vehicle, something which is noticeable for a driver. Subsequently a new, second gear is engaged by engaging the clutch of the second gear. Once again, when subsequently applying the torque this will be noticed by the driver. During power shift the transition from the current, first gear to the second gear is performed essentially without torque interruption. This is accomplished by that the clutch of the first gear gradually slips out while the clutch of the second gear gradually slips in such that the clutches transfer torque during an overlapping period. Thus, power shift essentially without torque interruption is preferred from a driver comfort perspective, but on the downside, power shift may lead to higher wear of the clutches. Also, in order to be able to perform a gear shift by power shift a certain minimum momentary torque has to be supplied by the engine.

If an upcoming gear change of a multi-clutch transmission is performed by power cut shift or power shift may be based on a number of vehicle variables such as e.g. fuel efficiency, vehicle weight, driver requests, road inclination and clutch wear. Power cut shift is generally favourable when the torque delivered by the engine is constant, such as during high way driving at constant speed, where a torque interruption is not that noticeable for the driver. For a gear shift performed when no torque interruption is desired, e.g. when driving uphill, the gear shift is advantageously performed by power shift. If the upcoming gear shift is performed by power shift or power cut shift is also dependent on between which gears the upcoming gear shift is to be performed. Power shift can only be performed for sequential gear shifts whereas during power cut shift intermediate gears can be skipped. Thus, skipping gears, which may be advantageous from a fuel consumption perspective, is only possible if power cut shift is applied.

Since power cut shift involves an interruption in torque delivery, whereas power shift does not, the two different shift methods are experienced differently by a driver. Thus, frequent changes between power shift sequences and power cut shift sequences are undesirable from a driver comfort perspective.

U.S. 2013/0172147 discloses a method and a device for operating a dual-clutch transmission providing a prediction model including at least one simulated shift sequence for the dual clutch transmission. The method includes predicting the time between a first power upshift/downshift and a second power upshift/downshift for the dual-clutch transmission by using the prediction model. If the predicted time between the first power upshift/downshift and the second power upshift/downshift is shorter than a predetermined time at least one parameter for operating the transmission is modified.

The method disclosed in U.S. 2013/0172147 improves the driveability and driver comfort, but there is still a need for further improvements.

It is desirable to provide a method for controlling a multi-clutch transmission of a vehicle, which method improves the driver comfort. It is also desirable to provide a computer program code means, a computer readable medium carrying such a computer program code means and a transmission control system comprising a control unit for running such computer program code means.

Previously known gear shift strategies use a number of predetermined vehicle variables to predict and determine if upcoming gear shift is to be performed as a power shift or as a power cut shift. The vehicle variables may be variables related directly to the vehicle, i.e. vehicle specific variables, variables related to the driving of the vehicle, i.e. driving specific variables, or variables directed to ambient conditions, i.e. ambient variables. Examples of vehicle specific variables are e.g. vehicle load and engine friction. Examples of driving specific variables are e.g. driver requested vehicle speed and vehicle acceleration. Examples of ambient variables are e.g. road inclination and the conditions of the road surface. The predetermined vehicle variables are used to determine current and/or anticipated vehicle behaviour, and based on current and/or predicted vehicle behaviour if an upcoming gear shift should be performed as a power shift or a power cut shift is determined. If power shift is applied a one step up- or downshift is performed essentially without interruption of the torque delivered during the shifting sequence. If power cut shift is applied there will be a momentary interruption of the torque delivered during the shifting sequence but the up- or downshift do not necessarily has to be to the next sequential higher or lower gear. Thus, when power cut shift is applied it is possible to skip gears.

From a driver comfort perspective it is desirable to avoid too frequent gear shifts, and the determination of type of gear shift may e.g. be based on the predicted time before a next forthcoming gear shift is performed. By applying power cut gear shift certain gears may be skipped and thereby the time spent driving on respective gear may be prolonged, whereas if power shift is applied no gears can be skipped. Thus, if the predicted time before a yet forthcoming gear shift is too short it is preferable to use power cut shift and skip at least one gear.

The gear shift strategy may however have the effect that the types of gear shift which is used for consecutive gear shifts changes frequently which may be experienced as annoying by a driver. This problem is addressed by the present method by detecting if a power shift is performed during upshifting in the low gear register, and if so, overruling the previously set gear shift strategy for forthcoming gear shifts and continue to shift gear only by power shift.

It is also desirable that the vehicle behaves in a consistent manner, meaning that the shifting sequence is more or less identical each time e.g. the same uphill climb is driven. If the way the gear shifting is performed is different each time a certain road distance is driven this will also be experienced as annoying by the driver. Such behaviour is also mitigated by applying the method of the present invention.

As previously stated, a known multi-clutch transmission for a vehicle is adapted to be shifted either with a power shift or by a power cut shift. Which type of gear shifting that is performed is controlled by a gear shift strategy, wherein the type of gear shift that is selected by the gear shift strategy is dependent on predetermined vehicle variables. Such a gear shift strategy comprises the method step of;

deciding a forthcoming gear shift as a power shift or a power cut shift dependent on a predicted behaviour of the vehicle based on momentary vehicle variables.

The method of the present invention is characterised in that it further comprises the method steps of:

detecting a power shift to a higher gear in the low range gear register, wherein if power shift to a higher gear in the low range gear register has been detected the method further comprises the steps of:

overruling the previously set gear shift strategy referred to above and;

controlling the multi-clutch transmission such that a forthcoming gear shift is performed as a power shift.

The detecting operation referred to above comprises registering when the control unit determines that an upcoming shift operation is to be performed as a power shift and alerting the control unit that the previous gear shift was performed as a power shift when a subsequent gear shift is to be performed.

Thus, the known applied gear shift strategy determines if an upcoming gear shift should be performed as a power cut shift or a power shift based on momentary vehicle variables. The momentary vehicle variables, which may be e.g. road inclination, vehicle load and vehicle acceleration, are used to determine a momentary and/or predicted behaviour of the vehicle.

By applying the method of the present invention once a power shift from a lower gear to a higher gear in the low gear register is detected the previously applied gear shift strategy is overruled and forthcoming gear shifts are performed as power shifts independently of what is determined by the previously applied gear shift strategy. This will reduce the number of changes between power shift and power cut shift which will improve the driver comfort.

When driving up a steep uphill slope, or particularly if starting a vehicle in an uphill slope, the gear shift strategy will with considerable certainty determine that an initiating gear shift should be performed as a power shift. By applying the method of the present invention this implies that all forthcoming gear shifts when driving up that uphill slope will also be performed as power shifts. Thus, by applying the method of the present invention the vehicle behaviour will also be consistent each time a steep uphill slope is driven. This is also important for the driver comfort.

The method, including all the method steps, is run by a control unit of the vehicle and is controlled by the software of the control unit. The control may e.g. be an electronic control unit or a transmission control unit. When referring to that the method is performed by a control unit this is not limited to that the method is performed by one single control unit. The method may be performed by a distributed control unit comprising numerous interacting control units and local controllers of the vehicle. This is also referred to as the computer of the vehicle. A computer is by definition a programmable electronic device that can retrieve, store, process and redistribute information, thus the same operations as the control unit, being a single component or a network of interacting components, is provided to perform.

Further aspects of the method comprise the method step of:

evaluating a momentary engine torque against a torque threshold value, wherein if the momentary engine torque is evaluated to be below the torque threshold value the aspect of the method further comprises the steps of;

overruling any of the previously set, gear shift strategies and;

controlling the multi-clutch transmission such that a forthcoming gear shift is performed as a power cut shift.

As previously disclosed, in order to be able to apply power shift a certain minimum engine torque has to be supplied by the engine. The minimum torque that has to be delivered is set to be the torque threshold value. This minimum engine torque threshold value is not dependent on any vehicle variables but only on that the torque delivered by the engine to the multi-clutch transmission is sufficient in order to perform a power shift. According to this aspect of the method, if the momentary engine torque is below the torque threshold value an upcoming shift operation will always be performed as a power cut shift independently of what is determined by any previously applied gear shift strategies. Thus, previously set gear shift strategies are overruled by this aspect of the method. By applying this aspect of the present invention it is assured that if gear shifting by power shift is allowed the torque supplied by the engine is sufficient to be able to also perform the power shift.

The present invention also relates to a computer program code means for performing the steps of any of, or a combination of, the herein disclosed aspects of the present invention when the computer program is run on a computer. Further, the present invention relates to a computer readable medium carrying a computer program comprising program code means as referred to above. The present invention additionally relates to transmission control system comprising any form of control unit arranged for controlling a multi-clutch transmission, wherein the control unit is programmed to perform the steps of any of or a combination of, the herein disclosed aspects of the present invention.

Further advantages and advantageous features of the invention are disclosed in the following description and in the dependent claims.

BRIEF DESCRIPTION OF THE DRAWINGS

With reference to the appended figures, below follows a more detailed description of embodiments of the invention.

DETAILED DESCRIPTION OF EXAMPLE EMBODIMENTS OF THE INVENTION

Figure 1:
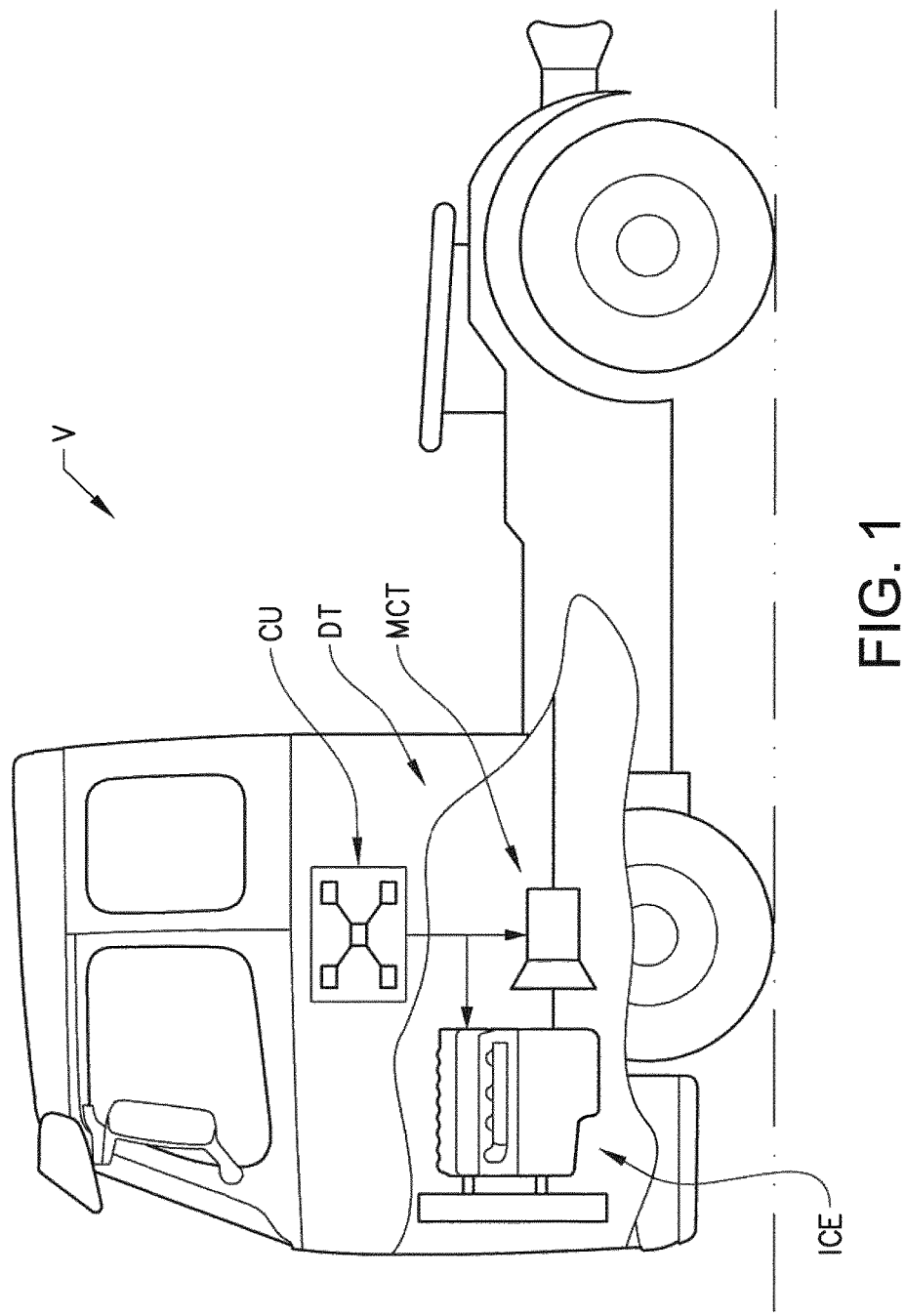
FIG. 1 shows a schematic view of a heavy-duty vehicle.

FIG. 1 shows a schematic view of a heavy-duty vehicle V comprising a drivetrain DT. The drivetrain DT comprises an internal combustion engine ICE, a multi-clutch transmission MCT and a control unit CU. The internal combustion engine ICE is connected to the multi-clutch transmission MCT such that the torque delivered by the combustion engine ICE for propulsion of the vehicle V is controllable by the multi-clutch transmission MCT. The combustion engine ICE and the multi-clutch transmission MCT is connected to and controlled by the control unit CU.

The multi-clutch transmission MCT is adapted to be controlled to perform gear shifts as either power shifts or as power cut shifts. Which shift type that is selected is dependent on predetermined vehicle variables. Typically, if e.g. the driving currently is static, such as when driving at constant speed on a highway, or when gears are skipped power cut shift is used whereas if the driving is dynamic, such as when driving up a steep slope with a heavy loaded vehicle, power shift is preferably used. A driver will generally experience power cut shift, with temporary torque interruption, to be more noticeable than power shift.

Figure 2A:
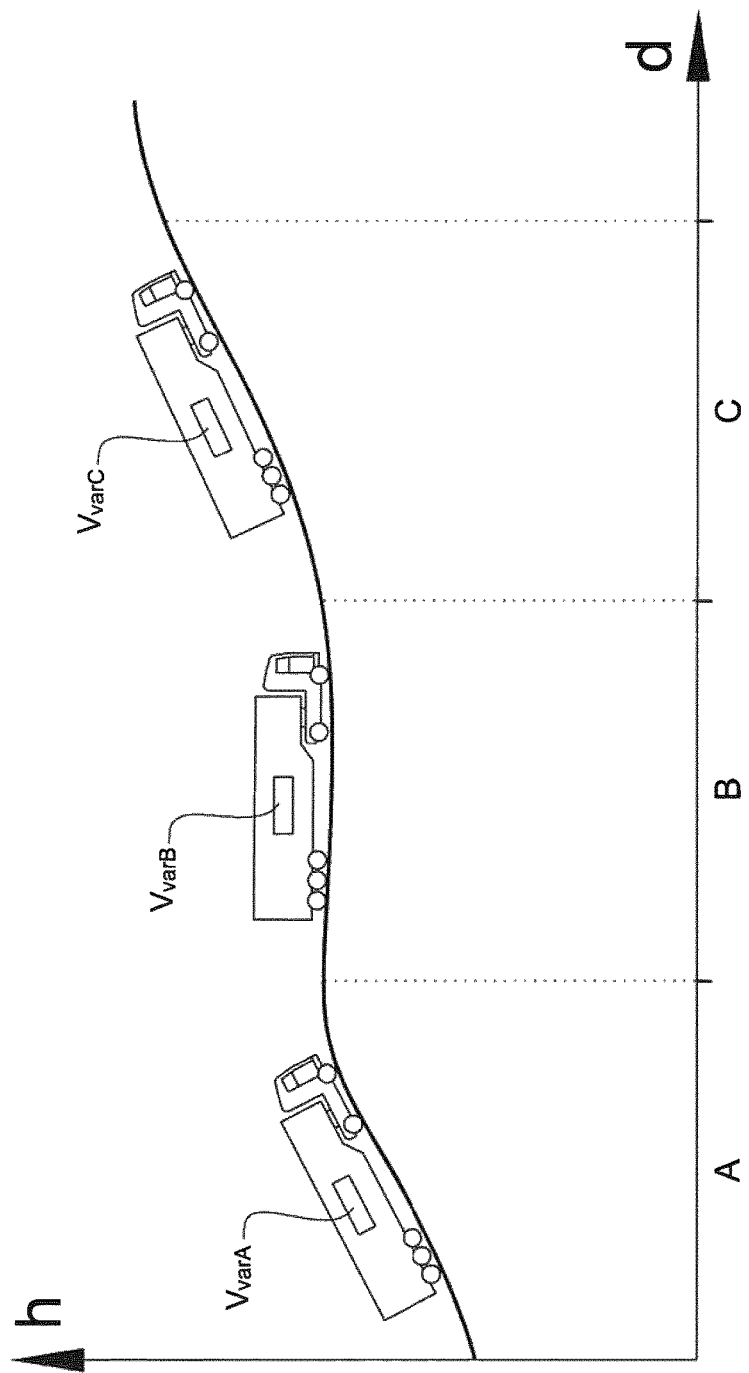
FIG. 2a shows a schematic topographic graph, provided to explain the method of the present invention.

FIG. 2a shows a schematic topographic graph provided to explain the method of the present invention where a not unit specified height h is shown on the y-axis and a not unit specified distance d is shown on the x-axis of the graph. FIG. 2a further discloses a schematic vehicle V at three different positions in three different sections, indicated section/position A, B and C, whereby vehicle variables, VvarA, VvarB and VvarC, of the vehicle V are dependent on the position A, B, C of the vehicle V.

The vehicle variables VvarA, VvarB, VvarC may e.g. be dependent on variables related to the vehicle V, i.e. vehicle specific variables such as e.g. vehicle load and vehicle specific properties such as engine friction, on variables related to the driving behaviour, i.e. driving specific variables such as e.g. driver requested vehicle speed and driver requested vehicle acceleration, and on variables related to the ambient conditions, i.e. ambient variables such as e.g. road inclination and the conditions of the road surface. Road inclination and vehicle load are two of the most important vehicle variables, meaning that they are two of the most influential parameters when e.g. gear shift strategy is determined.

According to previously known gear shift strategies momentary vehicle variables are used to predict and determine what type of upcoming gear shift that is appropriate. Appropriate type of gear shift is, as previously disclosed, e.g. dependent on the predicted time before a subsequent gear shift is needed.

Looking at an example where a known gear shift strategy is applied:
When driving in section A, where the road inclination is rather significant, an upcoming gear shift will most certainly be controlled to be performed by power shift since the predicted time which a subsequent gear, which to be shifted to, will be used will be sufficiently long. The predicted time the subsequent gear is used is determined by current and/or predicted driving behaviour, which in turn is determined by assessing momentary vehicle variables VvarA. Generally, a steep slope implies that fewer and less frequent gear shifts are initiated, especially if driving at low speed with a heavy loaded vehicle. When entering section B, where the momentary vehicle variables VvarB apply and where the road inclination is less significant, an upcoming gear shift will most certainly be determined to be performed as a power cut shift instead since, in order trot to have too frequent gear shifts, at least one gear needs to be skipped. When subsequently entering section C, with vehicle variables VvarC, once again the road inclination is significant and a forthcoming gear shift will most certainly be determined to be performed by power shift. The change from power shift in section A to power cut shift in section B and finally back to power shift in section C may be experienced as annoying for the driver.

According to an aspect of the method of the present invention, where detection of an upshift by power shift in the low range register overrules any previously set gear shift strategy, since a first gear shift was performed by power shift, a forthcoming gear shifts of section B will also be controlled to be performed by power shifts, even though the previously set gear shift strategy would normally not allow it given the prevailing vehicle variables of section B. Also forthcoming gear shifts in section C will be performed as power shifts. Applying the method of the present invention and overruling the previously set gear shift strategy will improve the driver comfort since a driver will experience consistent vehicle behaviour when driving the exemplary driving sequence comprising section A to C.

Figure 2B:
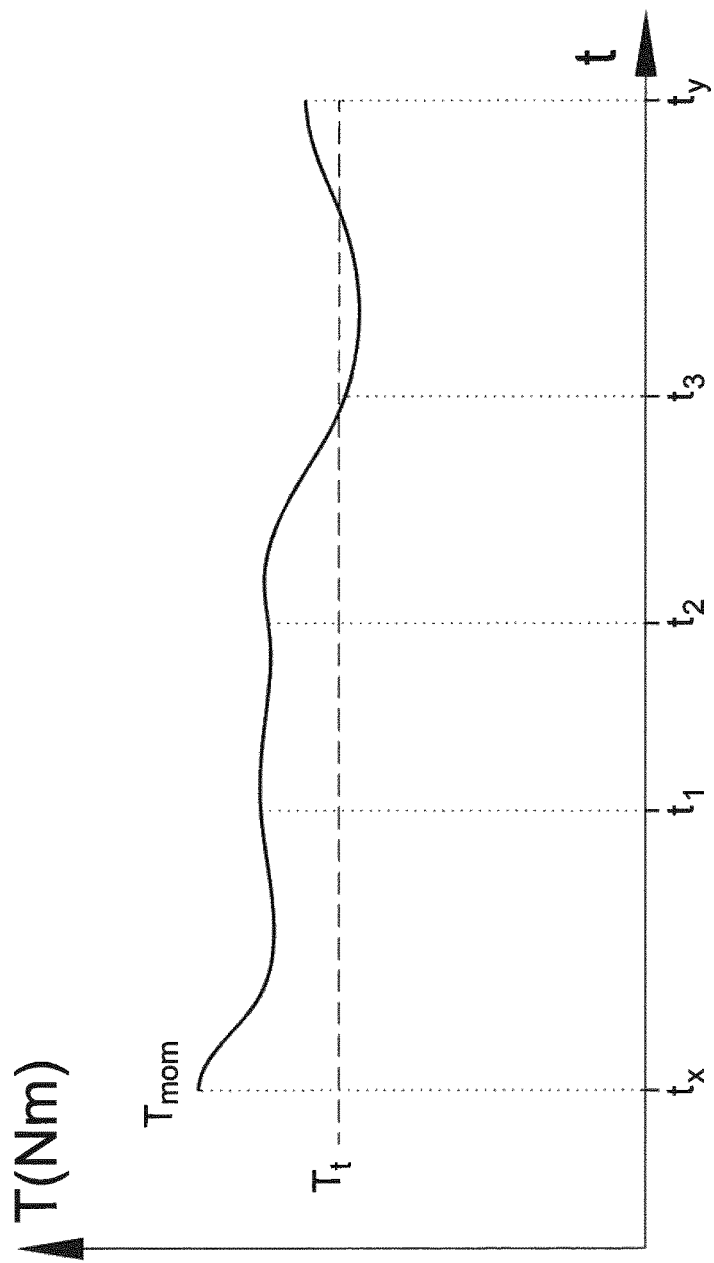
FIG. 2b shows time vs. torque graph provided to further explain aspects of the method of the present invention.

FIG. 2b shows a time t vs. torque T graph provided to explain further aspects of the method of the present invention. In 2b the horizontal line Tt indicates a torque threshold value. The torque threshold value Tt indicates the minimum engine torque at which power shift of the multi-clutch transmission is possible. Tmom indicates the momentary engine torque for the vehicle over time. As previously stated, according to known gear shift strategies and disclosed aspects of the present method an upcoming type of gear shift is dependent on momentary vehicle variables and if the previous gear shift was a power shift. In FIG. 2b is yet an aspect of the present invention disclosed.

In FIG. 2b three points in time, within the time interval tx to ty, are indicated, t1, t2 and t3. At t1 the momentary engine torque Tmom is higher than the torque threshold value Tt and consequently the gear shift strategy is not restricted in terms of type of gear shift due to too low applied engine torque. Also at t2 the momentary engine torque Tmom is higher than the torque threshold value Tt, providing no restrictions in terms of type of gear shift due to too low applied engine torque. The driving situations of t1 and t2 may e.g. be when driving a heavy loaded vehicle uphill.

At t3 the momentary engine torque Tmom is lower than the torque threshold value Tt. This may e.g. occur when e.g. rolling down a downhill slope at idle speed. According to the aspect of the present invention disclosed in FIG. 2b, when the momentary engine torque Tmom is lower than the torque threshold value it any previously set gear shift strategy is overruled and gear shifting is always done by power cut shift.

Figure 3B:
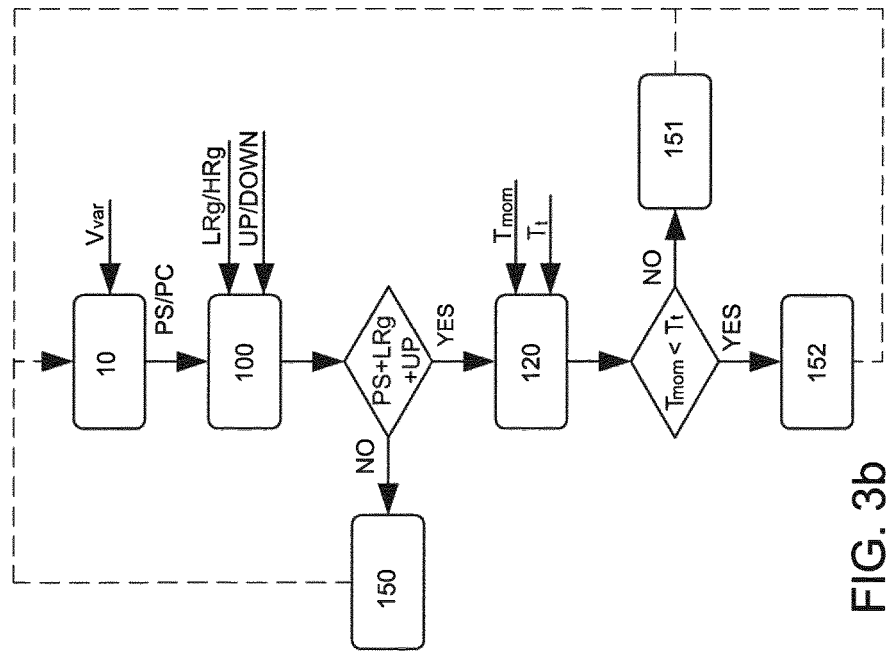
FIG. 3b shows a schematic block diagram over a second embodiment of the present invention.
Figure 3A:
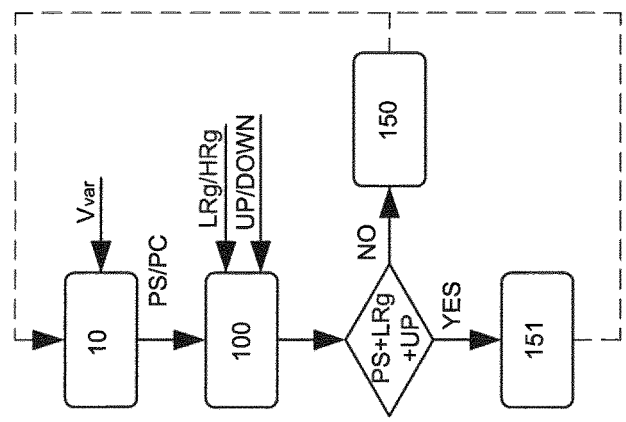
FIG. 3a shows a schematic block diagram over a first embodiment of the present invention.

FIG. 3a shows a schematic block diagram over an embodiment of an execution of the present method. The method is initiated by applying a known gear shift strategy for determining 10 if a forthcoming gear shift should be performed as a power shift or as a power cut shift. The determination of which type of gear shift that is to be performed is based on a number of predetermined vehicle variables Vvar which are used to determine a current and/or predicted driving behaviour. According to the method subsequently a detecting operation 100 is performed, where it is detected: what type of gear shift that was performed most recently PS/PC, if the most recent gear shift was from a lower to a higher gear or from a higher to a lower gear, thus if the shift was an upshift or a downshift UP/DOWN, and if the most recent gear shift was performed in the low or high gear range LRg/HRg. If it is detected that the most recent gear shift was a power shift from a lower gear to a higher gear in the low gear range PS+UP+LRg the previously set gear shift strategy is overruled and a method step of controlling 151 the multi-clutch transmission such that forthcoming gear shift is performed as a power shift is performed. If not, the controlling 150 of the gear shift is carried out according to previously set gear shift strategy.

FIG. 3b shows a schematic block diagram over another embodiment of the present method. The embodiment of the method disclosed in FIG. 3b comprises the method steps previously described in relation to FIG. 3a and additionally the embodiment of FIG. 3b comprises a method step of evaluating 120 if a momentary engine torque is lower than a torque threshold value Tmom<Tt. If the momentary engine torque Tmom is lower than the torque threshold value Tt any gear shift strategy is overruled and a method step of controlling 152 the multi-clutch transmission such that the forthcoming gear shift is performed as a power cut shift is applied.

The method described in relation to FIG. 3b is not restricted to one gear upshifts in the low gear range register but may be applied each time gear shill by power shift is about to be performed.

It is to be understood that the present invention is not limited to the embodiments described above and illustrated in the drawings; rather, the skilled person will recognize that many changes and modifications may be made within the scope of the appended claims.

It is also to be understood that the method steps referred to above not have to be performed sequentially as described but may also be performed essentially at the same time.

The invention claimed is:

1. A method for controlling a multi-clutch transmission (MCT) of a vehicle (V), wherein the multi-clutch transmission (MCT) is adapted to be shifted either with a power shift (PS) or a power cut shift (PC) dependent on predetermined vehicle variables, the method comprising:
   deciding that a forthcoming gear shift will be a power shift (PS) or a power cut shift (PC) via a first gear shift strategy dependent on a predicted behaviour of the vehicle (V) based on momentary ones of the vehicle variables,
   detecting that a most recent gear shift was a first power shift (PS) to a higher gear in a low gear range (LRg), and
   after detecting that the most recent gear shift was the first power shift (PS) to the higher gear in the low gear range (LRg)
      overruling the first gear shift strategy, and
      controlling the multi-clutch transmission (MCT) such that a forthcoming gear shift is performed as a second power shift (PS).

2. Method according to claim 1, wherein one of the momentary ones of the vehicle variables is a momentary engine torque (Tmom), the method further comprising:
   evaluating the momentary engine torque (Tmom) against a torque threshold value (Tt),
   detecting that the momentary engine torque Tmom) is below the torque threshold valve (Tt), and
   after detecting that the momentary engine torque (Tmom) is below the torque threshold value (Tt) then
      overruling any previously set gear shift strategy and;
      controlling the multi-clutch transmission (MCT) such that a forthcoming gear shift is performed as a first power cut shift (PC).

3. A computer comprising a computer program for performing the steps of claim 1 when the program is run on the computer.

4. A non-transitory computer readable medium carrying a computer program for performing the steps of claim 1 when the program product is run on a computer.

5. A transmission control system comprising a control unit (CU) programmed to perform the steps of claim 1 to control the multi clutch transmission (MCT).

* * * * *